(No Model.)

H. B. ALLAEYS.
PROCESS OF MAKING MOSAICS.

No. 490,467. Patented Jan. 24, 1893.

Witnesses
Geo. J. Kincaid.

Inventor
Honoré B Allaeys.
by John Wedderburn
his Attorney

UNITED STATES PATENT OFFICE.

HONORÉ B. ALLAEYS, OF FRENCHTOWN, MONTANA.

PROCESS OF MAKING MOSAICS.

SPECIFICATION forming part of Letters Patent No. 490,467, dated January 24, 1893.

Application filed July 23, 1892. Serial No. 441,023. (No specimens.)

*To all whom it may concern:*

Be it known that I, HONORÉ B. ALLAEYS, of Frenchtown, in the county of Missoula and State of Montana, have invented certain new and useful Improvements in Processes of Making Mosaics; and I do hereby declare the following to be a full, clear, and exact description of the invention, such as will enable others skilled in the art to which it appertains to make and use the same.

My invention consists of a simple and effective process of reproducing pictures in mosaics.

I have set forth fully hereinafter the details of my process and its essential features, and illustrated them in the accompanying drawings, in which—

Figure 1:
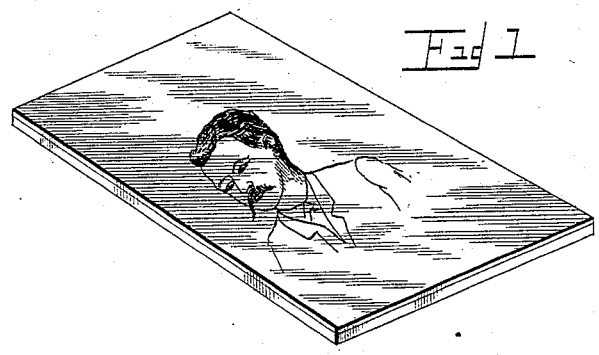
Figure 2:
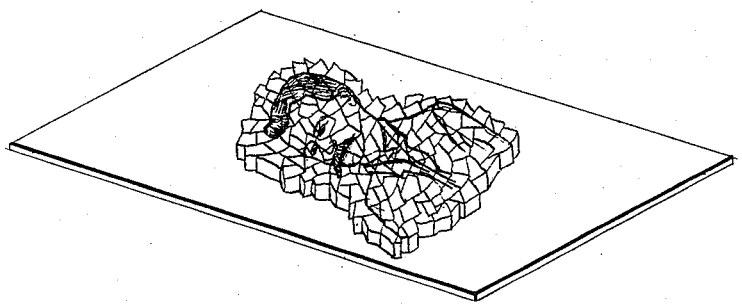
Figure 3:
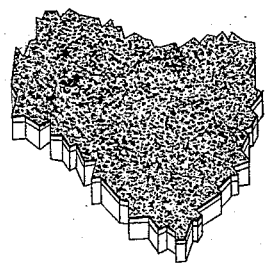
Figure 4:
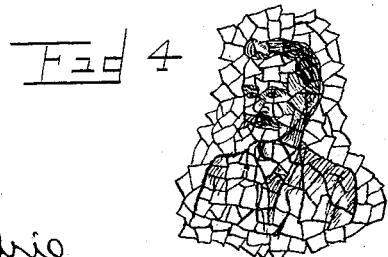

Figure 1 is a perspective view of a plate of glass placed over a picture. Fig. 2 is a view showing blocks of stone cemented to the under side of the glass. Fig. 3 shows the manner of cementing the blocks together, and Fig. 4 is a perspective view of the finished mosaic.

A plate of glass A is placed on top of the painting or picture B to be represented in mosaic, and a transparent colored sketch or copy of the picture B made on the upper surface of the glass A. The plate A is then held in such a position that the copy of the picture is plainly visible through the glass. The smooth surface of blocks of stone or other substance of which the mosaic is to be composed and of shades corresponding to those of the picture are then cemented to the under surface of the glass; when the entire under surface of the glass has thus been covered the under rough surface of the blocks composing the mosaic are covered with cement, thus forming a solid firm mosaic. When the cement has hardened sufficiently the glass plate is removed and the smooth or upper surface of the mosaic is polished and cleaned. Thus we have a simple and rapid method of reproducing any portrait or colored picture in mosaic.

Having thus fully described my invention, what I claim and desire to secure by Letters Patent, is—

The herein described process of reproducing pictures in mosaic which consists of tracing on a plate of glass by means of transparent colors the picture to be reproduced, then removably cementing blocks of stone or other substance of which the mosaic is to be composed, and of shades corresponding to the colors on the glass, on the under surface of said glass plate, and then coating the under surface of said blocks with a coating of suitable cement and lastly removing said glass plate and polishing the surface of said colored blocks substantially as and for the purpose set forth.

In testimony whereof I have signed this specification in the presence of two subscribing witnesses.

HONORÉ B. ALLAEYS.

Witnesses:
 F. X. BISSEN,
 JOSEPH BOUCHARD.